(12) United States Patent
O'Connor et al.

(10) Patent No.: US 9,839,154 B2
(45) Date of Patent: Dec. 5, 2017

(54) FLAT ROOF INVERTER RACK

(71) Applicant: SolarCity Corporation, San Mateo, CA (US)

(72) Inventors: Joseph Patrick O'Connor, Oakland, CA (US); Trevor B. Guthrie, Sana Rosa, CA (US); Kathryn Austin Pesce, San Francisco, CA (US); Nicholas S. Cohon, Petaluma, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 15/134,188

(22) Filed: Apr. 20, 2016

(65) Prior Publication Data

US 2017/0311475 A1 Oct. 26, 2017

(51) Int. Cl.
*H05K 7/18* (2006.01)
*H05K 7/14* (2006.01)
*H05K 7/20* (2006.01)
*F16M 13/02* (2006.01)

(52) U.S. Cl.
CPC ............. *H05K 7/18* (2013.01); *F16M 13/02* (2013.01); *H05K 7/14* (2013.01); *H05K 7/2089* (2013.01)

(58) Field of Classification Search
CPC .......... H05K 7/18; H05K 7/2089; H05K 7/14; F16M 13/02
USPC ........................................................ 211/26.2
See application file for complete search history.

(56) References Cited

U.S. PATENT DOCUMENTS

| | | | | |
|---|---|---|---|---|
| 640,354 | A | * | 1/1900 | Bailey ................. E06C 1/39 182/116 |
| 1,229,698 | A | * | 6/1917 | Arbess et al. ......... E06C 1/005 182/30 |
| 1,357,465 | A | * | 11/1920 | Mayer ................. A63G 21/00 182/49 |
| 4,618,029 | A | * | 10/1986 | Lowry ................. E04G 1/28 182/116 |
| 5,318,148 | A | | 6/1994 | Franco et al. |
| 5,570,864 | A | * | 11/1996 | Flores ................. E04G 3/26 248/148 |
| 5,622,237 | A | * | 4/1997 | Moldow ................. A62B 1/06 182/37 |
| 5,624,006 | A | * | 4/1997 | Richardson, Jr. ......... E04G 3/26 182/206 |
| 5,865,410 | A | | 2/1999 | Horen |
| 6,338,461 | B1 | | 1/2002 | Wallace et al. |
| 6,729,101 | B2 | * | 5/2004 | Macri ................. E04D 13/12 182/45 |
| 8,196,705 | B2 | * | 6/2012 | Jejina ................. E04G 1/38 182/150 |
| 8,336,277 | B1 | | 12/2012 | Rego et al. |

(Continued)

OTHER PUBLICATIONS

CIVICSOLAR, "AET Rayport-I Load Center Mounting Accessory", https://www.civicsolar.com/product/aet-rayport-i-disconnect-rack, downloaded Apr. 19, 2016, 2 pages.

*Primary Examiner* — Ko Hung Chan
(74) *Attorney, Agent, or Firm* — Kilpatrick Townsend & Stockton LLP (57) ABSTRACT

A multi-component inverter rack formed from sheet metal is disclosed. Some of the sheet metal derived parts used to form the multi-component inverter rack can be interchangeable. The multi-component inverter rack can include attachment points for an inverter, a load center and other supporting electrical components.

18 Claims, 12 Drawing Sheets

(56) References Cited

U.S. PATENT DOCUMENTS

| | | | |
|---|---|---|---|
| 8,371,076 B2* | 2/2013 | Jones | F24J 2/5237 |
| | | | 126/704 |
| D739,346 S | 9/2015 | Hannum | |
| D739,819 S * | 9/2015 | Hannum | D13/102 |
| 9,145,694 B2* | 9/2015 | Bulley | E04G 3/20 |
| D746,768 S | 1/2016 | Laitila et al. | |
| 9,263,985 B2 | 2/2016 | Silberschatz et al. | |
| 2002/0023346 A1* | 2/2002 | Butler | B60K 13/04 |
| | | | 29/890.08 |
| 2007/0101662 A1 | 5/2007 | Burgess | |
| 2015/0222220 A1 | 8/2015 | Laitila et al. | |

\* cited by examiner

FLAT ROOF INVERTER RACK

FIELD

The described embodiments relate generally to mounting equipment for affixing electrical equipment to the top of a roof. More particularly, the present embodiments are directed to a rack for supporting an inverter and a load center on a roof top.

BACKGROUND

Photovoltaic modules are often mounted to the tops of roofs as it gives the photovoltaic modules good sun visibility and places them in a location not ordinarily used for the storage of other types of devices. In commercial installations, the size of the photovoltaic module installation often requires the use of multiple supporting electrical components. These supporting electrical components can be placed on the roof next to the photovoltaic modules. In some instances the supporting electrical components can include a number of inverters that can be placed next to photovoltaic modules on the roof. Unfortunately, existing racks used to mount inverters to the roof of a building are often expensive and/or have structural weaknesses that make them unsuitable for safely securing expensive electrical equipment atop a roof.

SUMMARY

This disclosure describes various embodiments that relate to methods and apparatus for forming a robust rack configured to support an inverter and multiple supporting components.

A rack suitable for supporting an inverter atop a rooftop is disclosed. The rack includes a first support structure having a sloped surface configured to support an inverter at an acute angle with respect to a supporting surface upon which the first support structure is positioned. The rack also includes a second support structure coupled to the first support structure, the second support structure being positioned on the supporting surface and being configured to support a load center at a substantially orthogonal angle with respect to the supporting surface. Each of the support structures is formed of a number of substantially triangular support members, the substantially triangular support members of the first support structure being interchangeable with the substantially triangular support members of the second support structure.

In many embodiments, the first and second support structures are interchangeable.

In many embodiments, the first support structure is oriented in a first direction and the second support structure is oriented in a second direction substantially perpendicular to the first direction.

In many embodiments, when the rack is positioned upon the supporting surface, the second support structure extends substantially farther away from the supporting surface than the first support structure.

In many embodiments, the first support structure includes openings configured to accommodate the attachment of inverters having varied attachment feature configurations.

In many embodiments, the supporting surface is a roof having a pitch of less than ten degrees.

In many embodiments, the rack includes a shade cover coupled to the first support structure and configured to shade the inverter from the sun.

In many embodiments, the rack includes a shade cover that defines a number of openings that allow air to flow over and dissipate heat from the inverter.

In many embodiments, the rack include cross struts that couple the support members of the first support structure together and support the inverter.

In many embodiments, the support members of the first support structure are coupled together using cross struts that also support the inverter at the acute angle A method for building an inverter rack is disclosed. The method includes cutting one or more metal sheets into a number of flat pattern sheets; folding the flat pattern sheets into three dimensional components; fastening overlapping flaps of one or more of the three dimensional components together; and coupling the three dimensional components together to form interchangeable triangular support members of the inverter rack.

In many embodiments, the method also includes coupling at least two of the interchangeable triangular support members together with a pair of cross members.

In many embodiments, the one or more metal sheets include metal sheets of different thicknesses.

In many embodiments, folding the flat pattern sheets into three dimensional components includes stamping a structural rib into one of the flat pattern sheets.

In many embodiments, folding the flat pattern sheets into three dimensional components includes folding a single flat pattern sheet into a three dimensional component having three legs.

An inverter rack assembly is disclosed and includes the following: an inverter rack having a sloped surface configured to support an inverter at an acute angle with respect to a supporting surface upon which the inverter rack is positioned; and a load center support structure coupled to the inverter rack, the load center support structure having substantially the same shape as the inverter rack and being positioned on the supporting surface in an orientation substantially orthogonal with respect to the orientation of the inverter rack. Both the inverter rack and the load center support structure are formed of a number of interchangeable substantially triangular support members.

In many embodiments, the inverter rack assembly also includes a shade cover coupled with the inverter rack and configured to shield the inverter from the sun.

In many embodiments, the shade cover includes a shade top coupled to the inverter rack by two shade panels.

In many embodiments, the inverter rack includes an anchor attachment coupling the inverter rack to the supporting surface.

In many embodiments, an anchor attachment includes an attachment strut extending through an opening defined by each substantially triangular support member of the inverter rack; and roof anchors coupling the attachment strut to the supporting surface.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Inverters generally accompany a solar array installation so that DC power generated by each photovoltaic module making up the solar array can be converted to AC power. The DC to AC conversion is performed so that the collected energy can be more easily integrated with existing electrical systems within the building. Inverters in support of rooftop mounted solar arrays are often mounted to the rooftop proximate the solar arrays so that the inverters do not take up space elsewhere and can be easily tied in to the solar array. Positioning the inverters upon the roof proximate the solar array can be a particularly compelling solutions for commercial installations with fairly flat rooftops having a pitch of less than about 10 degrees as the inverters are less likely to take away from the overall aesthetic look of the building.

Unfortunately, conventional inverter racks built to mount these inverters to the rooftop are often made from high cost materials, require time-intensive assembly processes and in some cases are not sturdy enough for their intended purpose. These are serious liabilities for a mounting structure responsible for securing high cost equipment such as inverters to the roof of a building. In some cases, the racks are constructed by welding metal legs together. The welding process can be time intensive and not sure to produce a robust joint. Furthermore, as each of the inverters is often electrically coupled to other equipment, a failure of one of the racks could also result in damage to other components associated with the solar array or even be a safety hazard were the inverter to fall off the roof due to rack failure.

One solution to the aforementioned problem is to form an inverter rack from folded sheets of metal. In some embodiments, the sheets of metal can take the form of steel sheets cut into flat patterns that are subsequently folded to assume a desired size and shape. Because the various sides of the parts are folded instead of welded, the likelihood of part failure is greatly reduced. Three-dimensional structures generated by folding the metal flat patterns can be further reinforced through the use of overlapping flaps, which can be bolted or riveted together to create a robust three-dimensional structure. In some embodiments, the metal sheet thickness used to form various parts can vary. For example, a non-load bearing component can be formed from a substantially thinner sheet of metal than a load-bearing component. Additionally, by shipping the inverter racks in flat patterns without folding them first, the space taken up by the components can be greatly reduced. In such a case a local distribution facility could have the equipment needed to fold the flat patterns into three-dimensional structures.

In some embodiments, structural components of the inverter rack can be designed to be interchangeable. For example, structural components used to form the inverter rack can have substantially the same dimensions along with redundant openings that allow placement of the pieces at any one of a number of locations within the device. In some embodiments, a spare part can be provided that could be used to replace any one of the large numbers of structural components. In other embodiments, interchangeable structural component could be part of an optional add-on components, so that in cases where the optional add-on component were not needed the interchangeable part could be used to replace damaged or lost parts. In some cases, the interchangeable parts intended for the optional add-on component could instead be used to create a second rack inverter rack.

Another way to increase the efficiency and utility of the inverter racks is to design the racks to support multiple different types of inverters and to equip the racks with attachment points for other related electrical components. For example, the inverter racks can be configured to support components such as load centers, disconnects and combiner boxes. In this way the number of openings included in the inverter rack can be limited to a reasonable number of openings without having a negative structural effect on the inverter rack. In some embodiments, a load center can take the form of a circuit breaker cabinet for distributing AC power converted by the inverter from energy received from an array of photovoltaic modules. Further, the support components can include hole patterns configured to accommodate inverters of various sizes and shapes. In some embodiments, the inverter racks can be configured to support a limited number of inverters, when a designer of the inverter racks is reasonably certain a limited number of inverters will be used with the inverter rack. For example, the hole patterns of the inverter rack could be designed to function with inverters made by Fronius®, SMA America and Solectria™ Solar.

These and other embodiments are discussed below with reference to FIGS. 1-10; however, those skilled in the art will readily appreciate that the detailed description given herein with respect to these figures is for explanatory purposes only and should not be construed as limiting.

Figure 1:
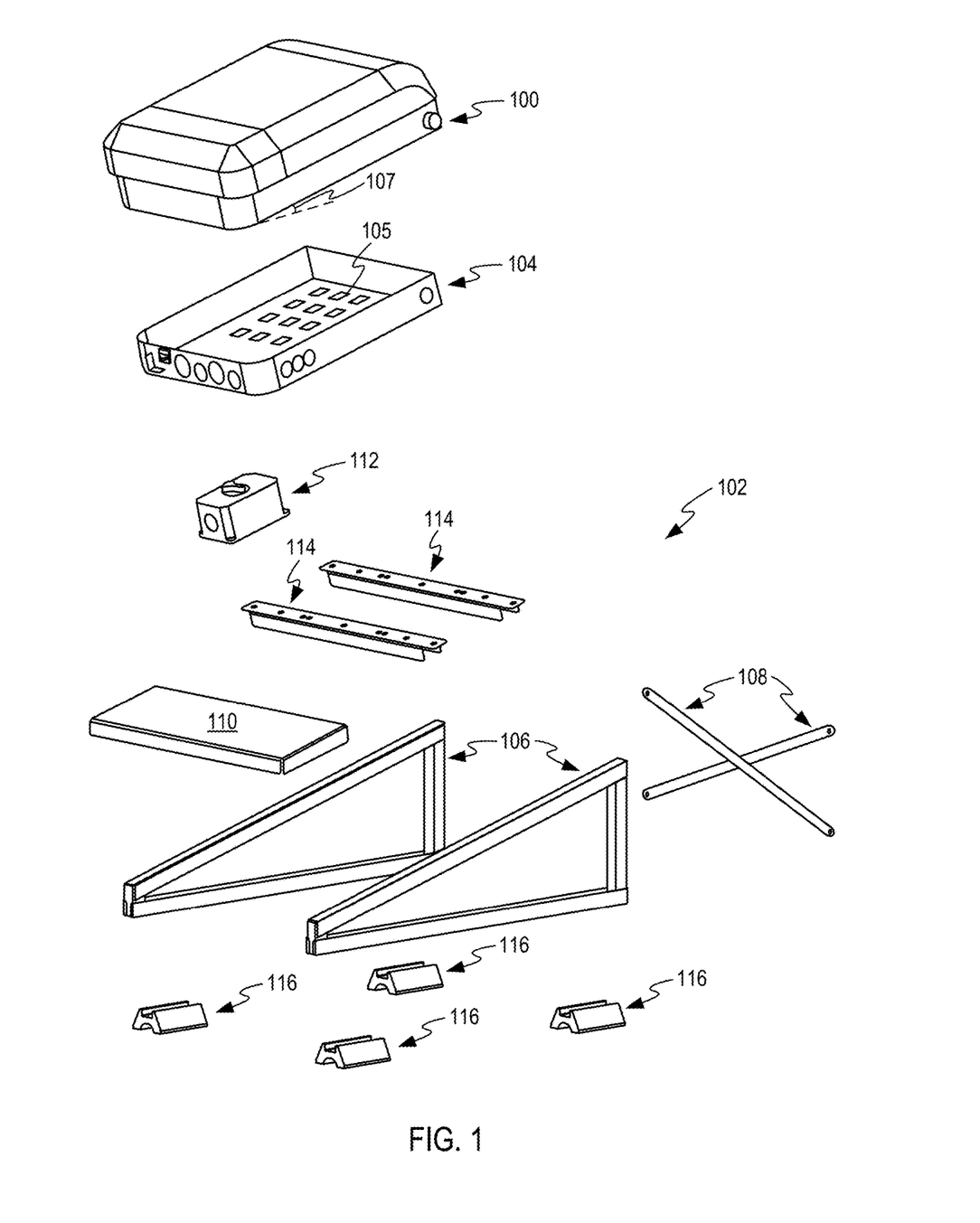
FIG. 1 shows an exploded view of a rack configured to mount an inverter to a substantially flat roof.

FIG. 1 shows an exploded view of inverter 100 and inverter rack 102 for mounting inverter 100 to a rooftop. Inverter rack 102 is well suited to mount an inverter atop a roof of less than about ten degrees in pitch. Inverter 100 includes an inverter mounting plate 104 for securing inverter 100 to inverter rack 102. Inverter mounting plate 104 can include a number of mounting features 105 suitable for receiving a fastener to secure inverter mounting plate 104 to inverter rack 102. While inverter rack 102 is positioned to support inverter 100 it should be understood that inverter rack 102 can support multiple different kinds of inverters. Inverter rack 102 includes many structural components formed by bending flat patterns of sheet metal. Inverter rack 102 is formed primarily of two triangular support members 106, which orient inverter 100 at an elevation angle 107 of about 15 degrees with respect to a supporting surface upon which inverter rack 102 is mounted. Each of triangular support members 106 can be formed of substantially the same component types, which will be described in greater detail below. Cross-bars 108 can be configured to join rear-facing ends of support members 106. Mounting plate 110 can be configured to join front ends of support members 106 and provide a surface upon which other components such as disconnect 112 can be secured. For example, a combiner box could be mounted adjacent to disconnect 112. The combiner box could be configured to help electrically couple inverter 100 to a string of other inverters. Disconnect 112 can be configured to add or remove inverter 100 from the string of other inverters. Cross struts 114 can be configured to bridge a gap between support members 106 and to provide mounting points and support for inverter 100 and inverter mounting plate 104. Inverter rack 102 can also have a number of deformable feet 116, made of material such as rubber or other elastomeric material.

Figure 2:
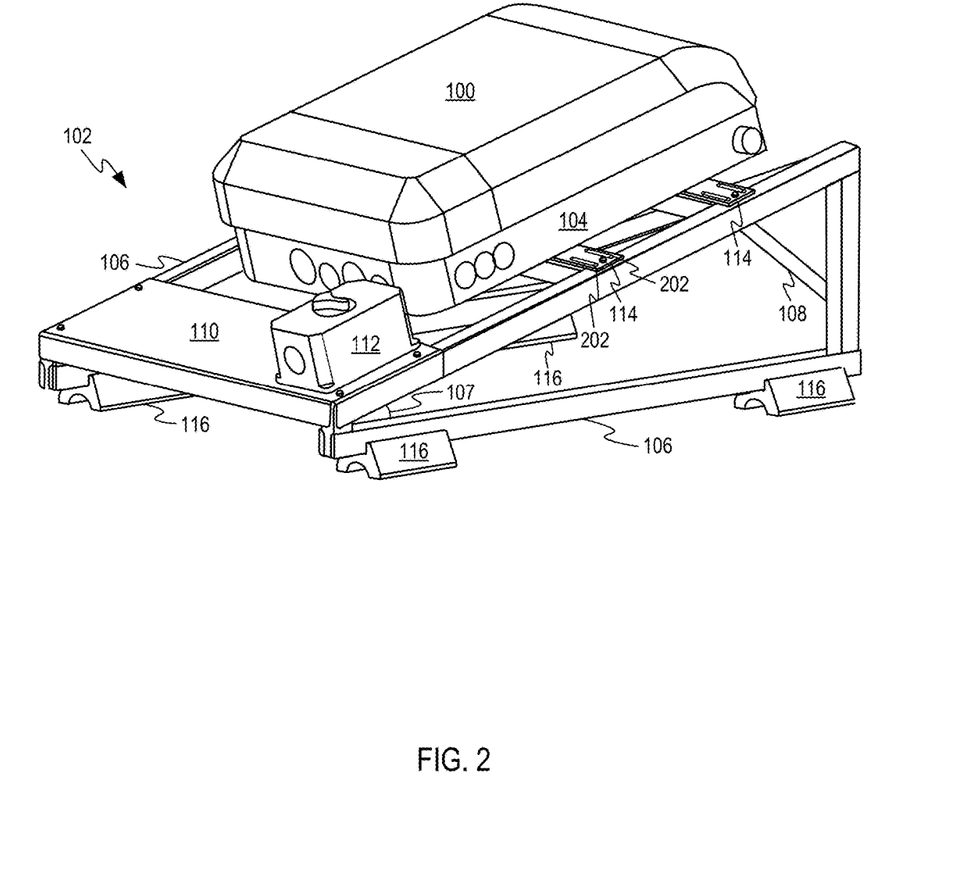
FIG. 2 shows an assembled version of the rack components depicted in FIG. 1.

FIG. 2 shows a perspective view of inverter 100 supported by an assembled inverter rack 102. As depicted, inverter mounting plate 104 is attached to and supported by cross struts 114. Inverter mounting plate 104 defines a cavity in which a lower portion of inverter 100 sits. Cross struts 114 include structural ribs 202 that help to prevent the deformation of the portions of cross struts 114 coupled to support member 106. FIG. 2 also shows a position at which disconnect 112 is bolted to mounting plate 110. As depicted it should be appreciated that there is space for additional components to be mounted to mounting plate 110 proximate disconnect 112. FIG. 2 also shows how cross-bars 108 can be used to secure the rear-facing, taller end of support members 106 together. It should be noted that elevation angle 107 can be about 15 degrees. This angle provides a substantial amount of space below inverter 100 and a surface upon which inverter rack 102 is supported. This space below inverter 100 can allow a sufficient amount of airflow to pass beneath inverter 100 to keep it sufficiently cooled during operation.

Figure 3A:
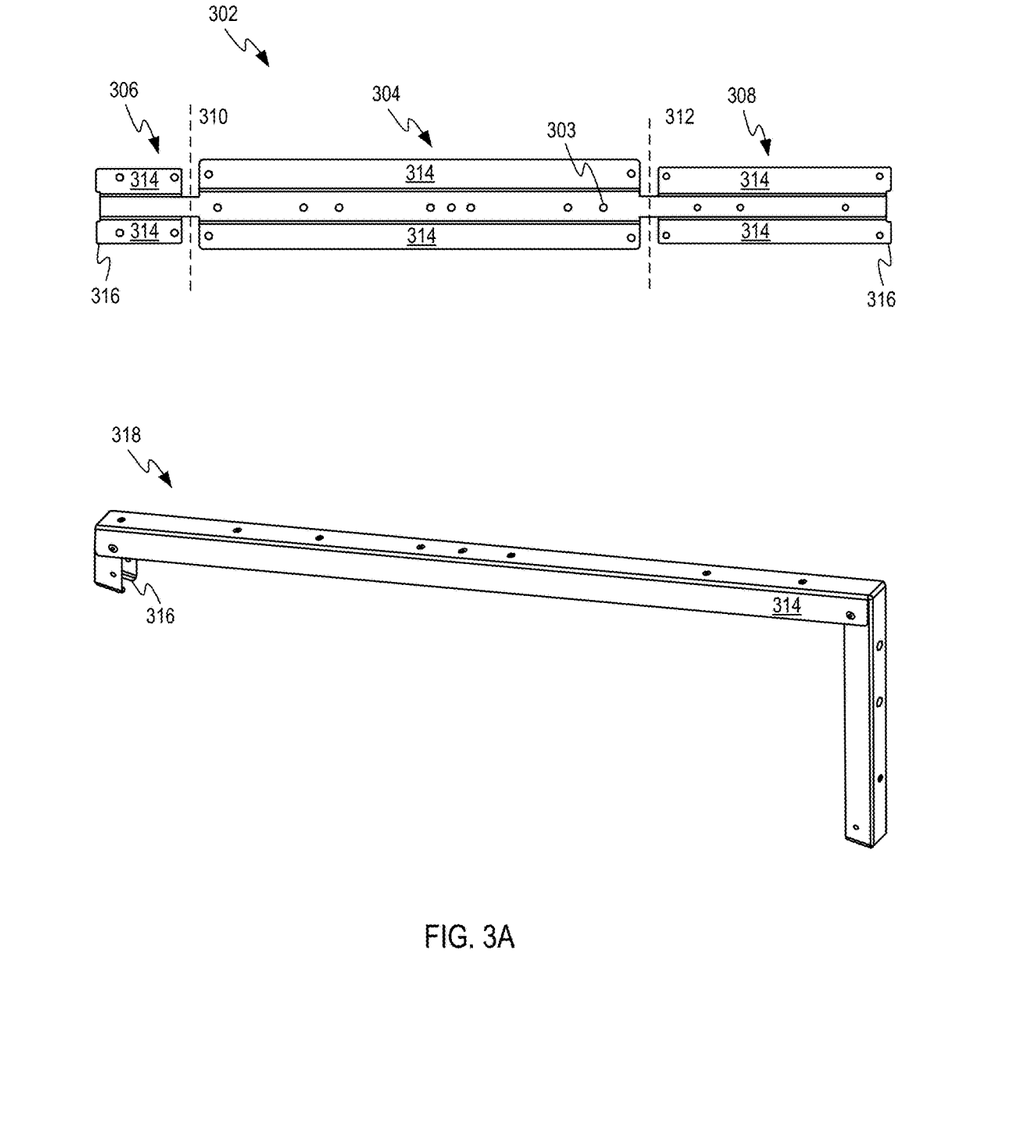
FIGS. 3A-3B show components of a support structure of the rack depicted in FIGS. 1 and 2.

FIG. 3A shows flat metal sheet 302, used to form a portion of support member 106. Metal sheet 302 can be stamped or cut from a larger piece of sheet metal to achieve the flat pattern shape depicted in FIG. 3A. In addition to the shaping process, openings 303 can be punched or otherwise formed in metal sheet 302. Openings 303 can be configured to receive fasteners such as screws, rivets and fasteners configured to work with self-clinching standoffs (e.g., PEM® Fasteners). The flat pattern shape of metal sheet 302 includes three regions that correspond to three legs of support member 106. In particular, the regions include first region 304, second region 306 and third region 308. To form the structural support component of the support member, each of the regions can be folded or bent with respect to one another along reference lines 310 and 312. In some embodiments, the folding can be carried out by deforming portions of metal sheet 302 over a curved surface of a fixturing device having a desired curvature so that the metal sheet can have that same curvature. In some embodiments, the fixturing device can have multiple curved surfaces corresponding to each fold of support member 106. In this way, a precise gradual curvature can be achieved and any inadvertent creation of sharp corners can be avoided. The curved surface can also include reference surfaces for achieving a desired angle for each corner portion of support member 106.

Flaps 314 of regions 304-308 can also be bent or folded approximately 90 degrees before or prior to the bending along reference lines 310 and 312. It should be noted that flaps 314 of region 304 are substantially longer than flaps 314 of regions 306 and 308. For this reason, region 304 can be bent in a manner making it wider than regions 306 and 308. Finally end tabs 316 can also be bent at a 90-degree angle with respect to flaps 314. In this way, completed structural support component 318 can be formed. The depictions of completed structural support component 318 show how flaps 314 of regions 304 and 306 overlap as well as flaps 314 of regions 304 and 308. Region 304 of structural support component 318 is wide enough to receive portions of regions 306 and 308 within a channel defined by flaps 314 of region 304. The overlapping flaps 314 can then be bolted together so that the angle of regions 304-306 can be fixed and unchanging. End tabs 316 provide a curved surface that can interface and be complementary with another structural support component of support member 106.

Figure 3B:
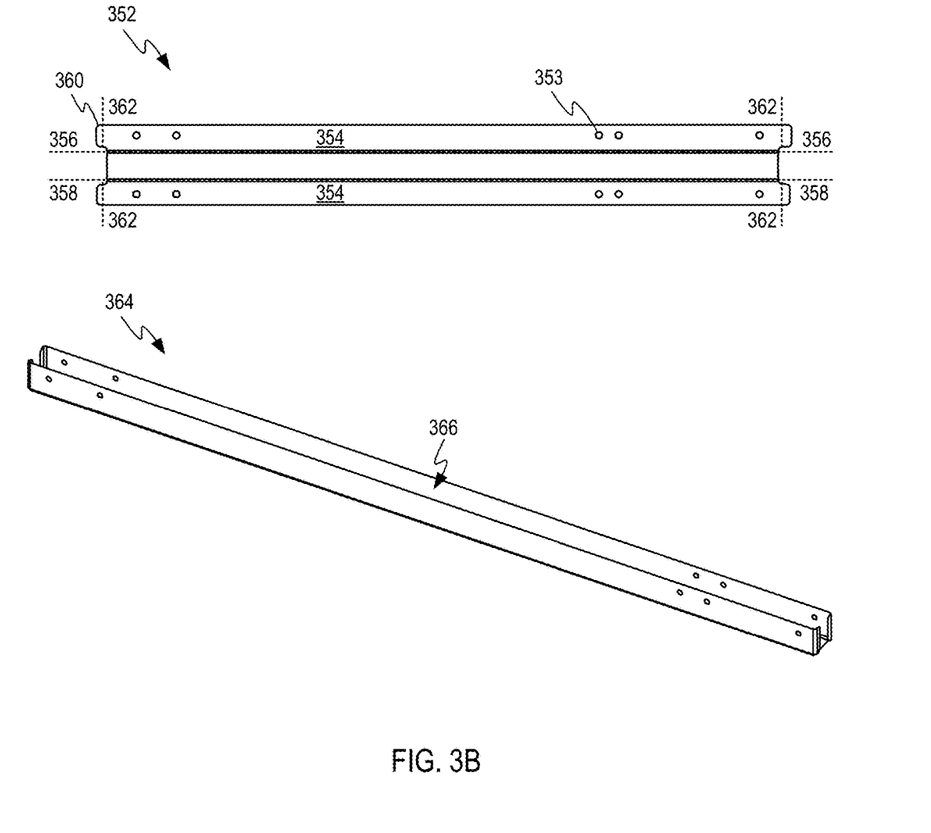

FIG. 3B shows a flat metal sheet 352 used to form a portion of support member 106. Metal sheet 352 can be stamped or cut from a larger piece of sheet metal to achieve the shape depicted in FIG. 3B. In addition to the shaping process, openings 353 can be punched or otherwise formed in metal sheet 352. Openings 353 can be configured to receive fasteners such as screws and rivets. In some embodiments, both metal sheet 302 and metal sheet 352 can be cut from the same sheet of metal. Metal sheet 352 includes two flaps 354 that can be folded or bent about 90 degrees along reference lines 356 and 358. End tabs 360 can be folded or bent about 90 degrees along reference lines 362. In this way, completed structural support component 364 can be formed from metal sheet 352. Structural support component 364 defines channel 366 configured to receive distal ends of structural support component 318.

Figure 3C:
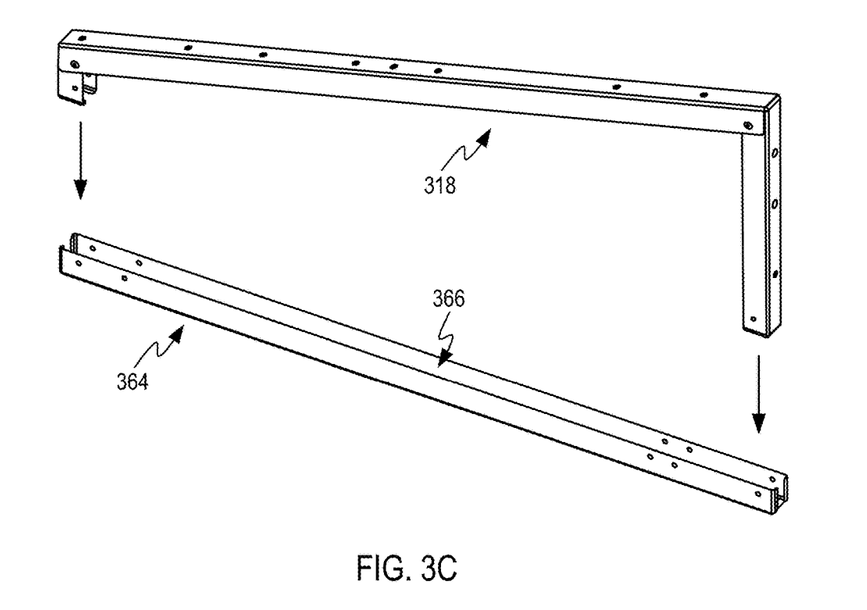
FIGS. 3C-3D show how the components of the support structure can be joined together.
Figure 3D:
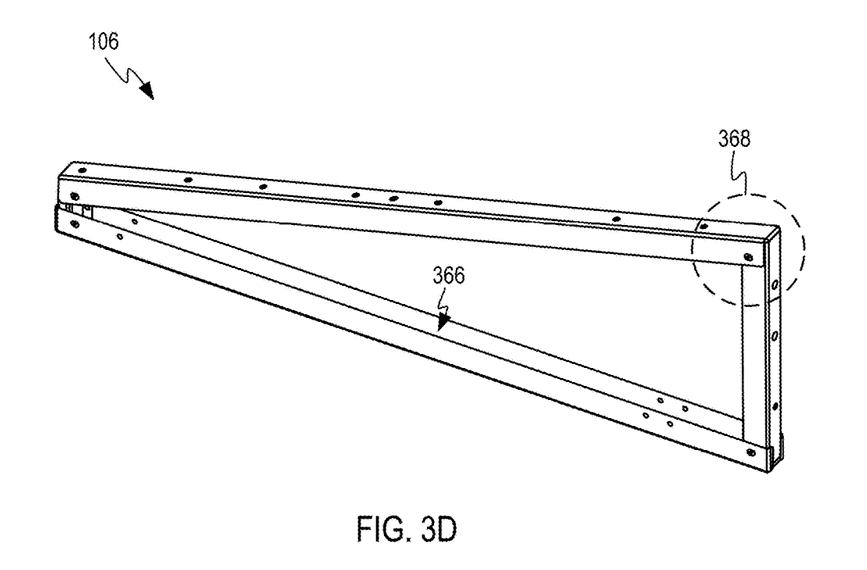

FIGS. 3C-3D show how structural support components 318 and 364 can be aligned and then joined together to form support member 106. In particular, FIG. 3C shows how distal ends of regions 306 and 308 can be aligned with opposing ends of structural support component 364. FIG. 3D shows the distal ends of structural support component 318 sitting within channel 366 defined by structural support component 364. The curved ends of regions 306 and 308 help make portions of structural support component 318 contacting structural support component 364 complementary to interior geometries of structural support component 364. In this way, structural support component 364 acts as a base for support member 106 when support member 106 is positioned in this orientation. It should also be noted that flaps 354 and some of flaps 314 extend about the same amount laterally from each side of support member 106, giving each side of support member 106 a substantially uniform thickness at the top and bottom. This configuration allows support member 106 to lay flat, making packing of the assembled support member 106 more convenient. Dashed circle 368 indicates one corner of support member 106.

Figure 4A:
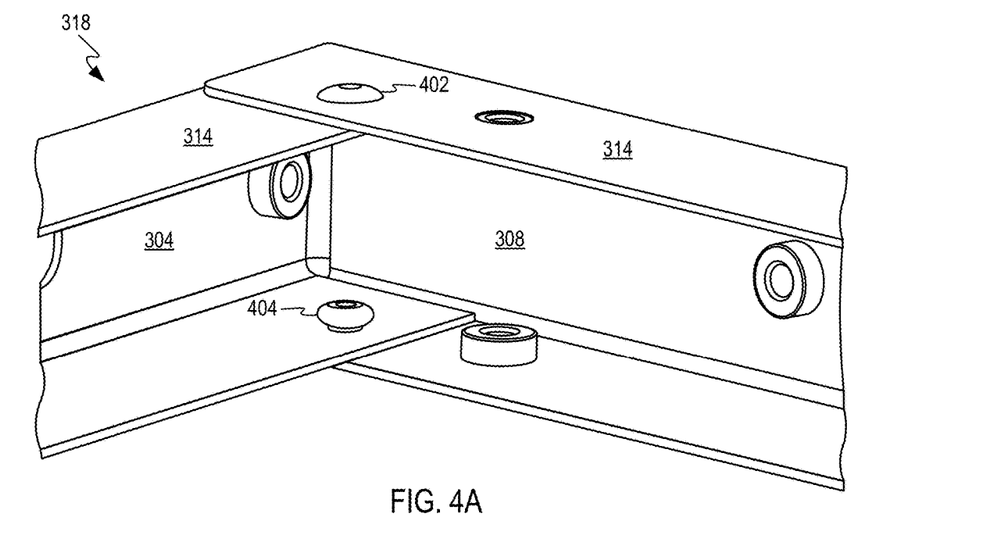
FIGS. 4A-4B show close up views of a corner of the support structure and how the corner can be bolted together to hold it in place.
Figure 4B:
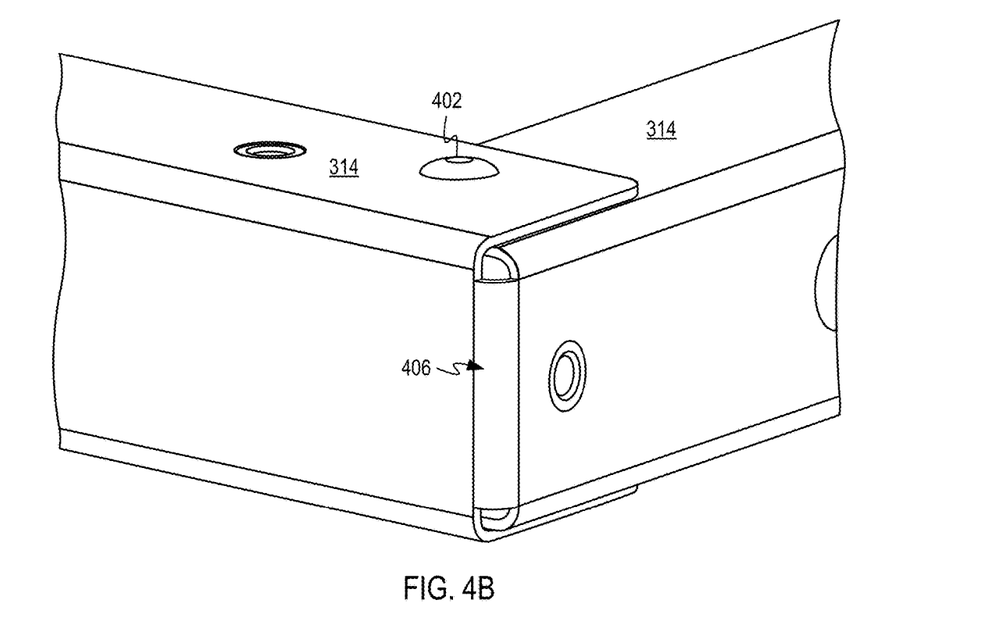

FIGS. 4A-4B show various perspective views of a portion of support member 106 in accordance with dashed circle 368 (shown in FIG. 3D). FIG. 4A shows fastener 402 coupling flaps 314 of regions 304 and 308. Fasteners 402 engage a washer similar to depicted washer 404 so that flaps 314 are rigidly coupled together. Fasteners 402 and washers 404 can be configured to couple flaps 314 together by threading fasteners 402 through overlapping openings defined by each of flaps 314. In some embodiments, fasteners 402 can become permanently deformed within washer 404 to achieve a permanent coupling between flaps 314. It should be noted that other openings in regions 304 and 308 are depicted and can be used to attach other components to support member 106. FIG. 4B shows an outward facing corner of structural support component 318. In particular, corner portion 406 is depicted having a curved geometry that prevents the creation of sharp corners that could scrape or damage other components or installation personnel. The curvature should also be defined precisely so that openings through which fasteners 402 pass are aligned. In some embodiments, the inside radius of corner 406 can be about the same as the thickness of the metal sheet used to form the structural support component. For example, when using a 0.2 inch thick steel sheet, corner 406 can have an inside radius of about 0.2 inches. In other embodiments, the radius can be larger or smaller.

Figure 5A:
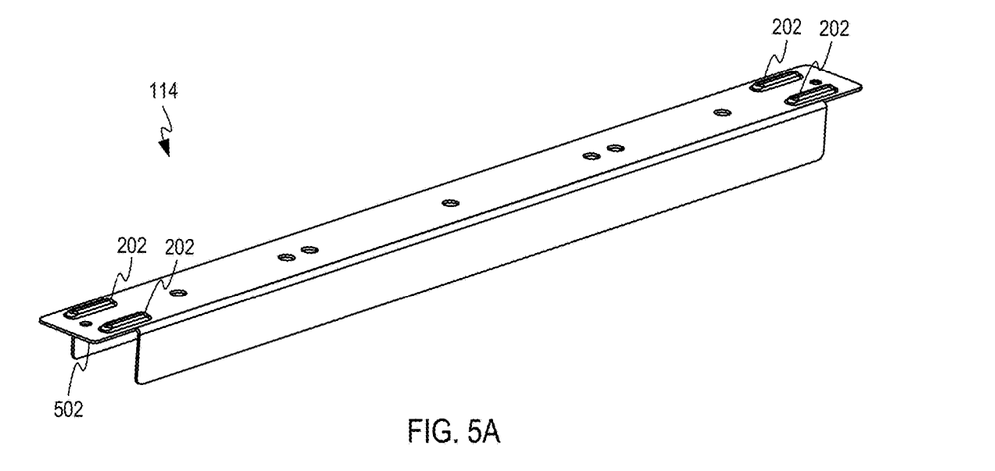
FIG. 5A shows a close up perspective view of a cross strut associated with the inverter rack.

FIG. 5A shows a perspective view of cross strut 114. In particular, cross strut 114 includes structural ribs 202. Structural ribs 202 can be configured to reinforce tabs 502 that substantially bear the load of inverter 100. This can allow the sheet metal forming cross strut 114 to be formed from a relatively thinner metal sheet than would otherwise be required to prevent failure without the use of structural ribs 202. In some embodiments, structural ribs 202 can be stamped into cross struts 114. It should be noted that while only two cross struts 114 are depicted that additional cross struts 114 could be added to provide additional support to inverter 100. In some embodiments, three or more cross struts 114 could be included so that inverter rack 102 can be utilized to support inverters of various sizes and weights. Inverter rack 102 can include instructions detailing how many cross struts 114 to use for a given type of inverter.

Figure 5B:
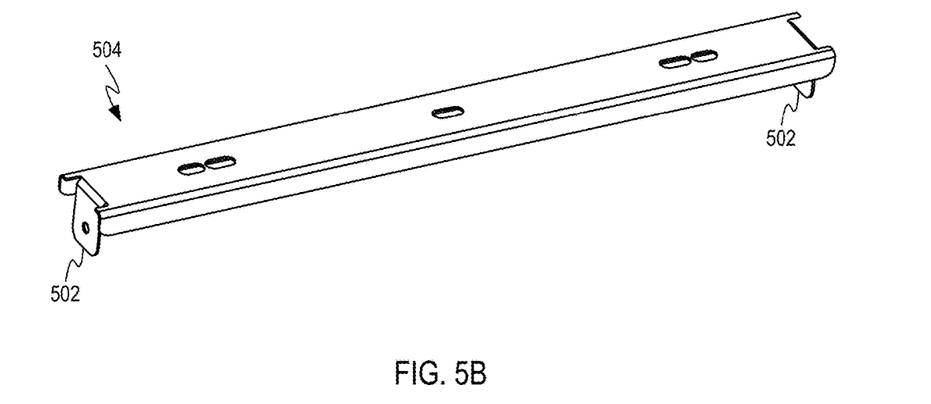
FIG. 5B shows a close up perspective view of a cross strut associated with the load center attachment component.

FIG. 5B shows cross strut 506 with tabs 504 bent 90 degrees with respect to cross strut 504. While cross strut 504 is somewhat different from cross strut 114 in that it doesn't include structural ribs 202, this is on account of cross strut 504 being arranged differently and therefore receiving lateral forces with tabs 502. In particular, instead of acting upon a thin cross-section of tab 502, tab 502 is instead acted upon along its width, making deformation substantially more unlikely and therefore not in need of reinforcement (see load center support rack 600 in FIG. 6). Furthermore, the addition of structural ribs to tabs 502 could reduce the effectiveness of tabs 502 in resisting loading forces acting upon it. Otherwise, cross struts 114 and 504 can be folded and constructed in very similar manners.

Figure 6:
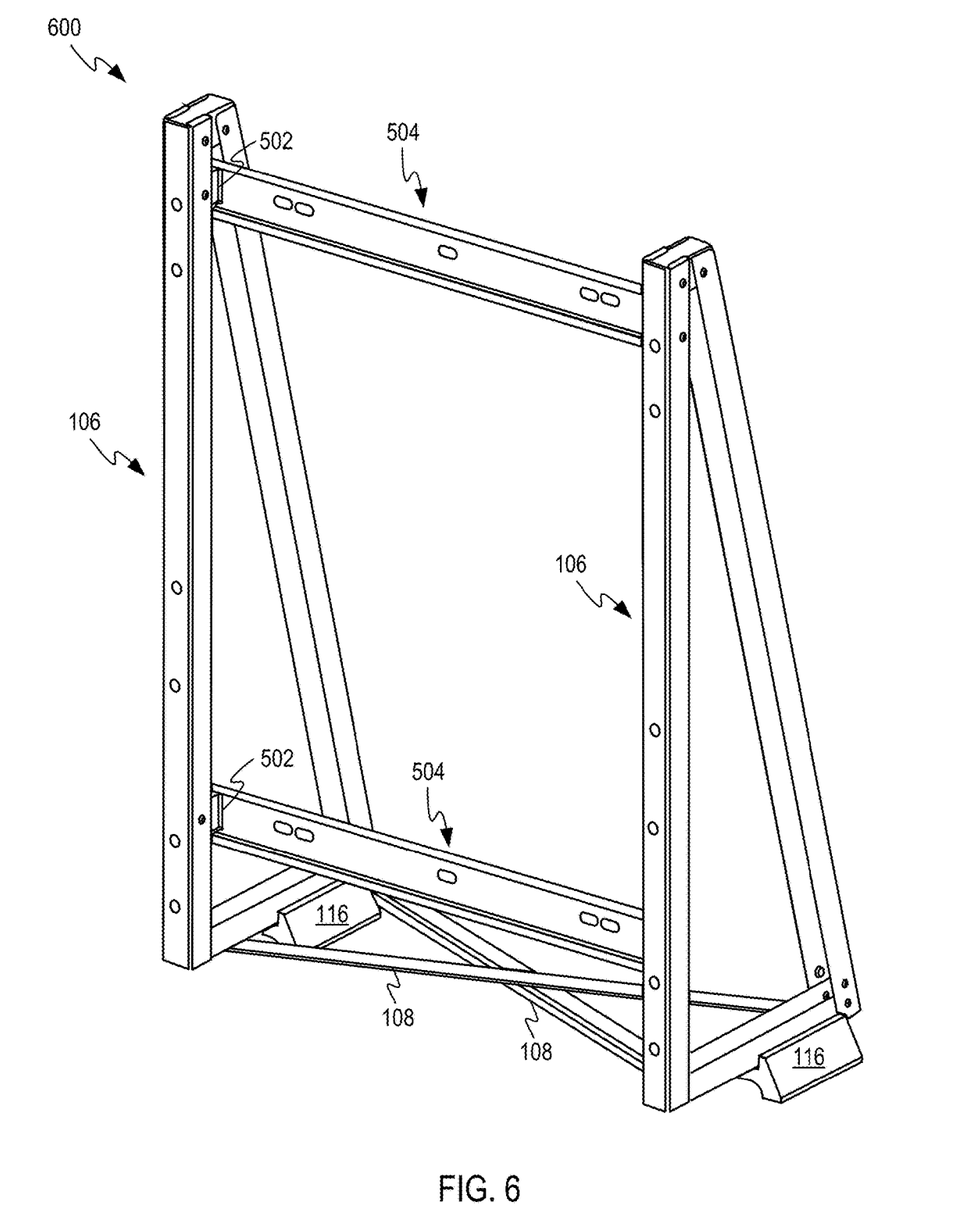
FIG. 6 shows a perspective view of a load center attachment feature formed from two of the support structures depicted in FIG. 3D.

FIG. 6 shows a perspective view of load center support rack 600. Similar to inverter rack 102, load center support rack 600 is formed from two support members 106 joined by two cross struts 504. Cross struts 504 can include tabs 502 that are bent 90 degrees with respect to cross struts 504 so that cross struts 504 can be coupled with interior facing surfaces of support member 106.

Figure 7A:
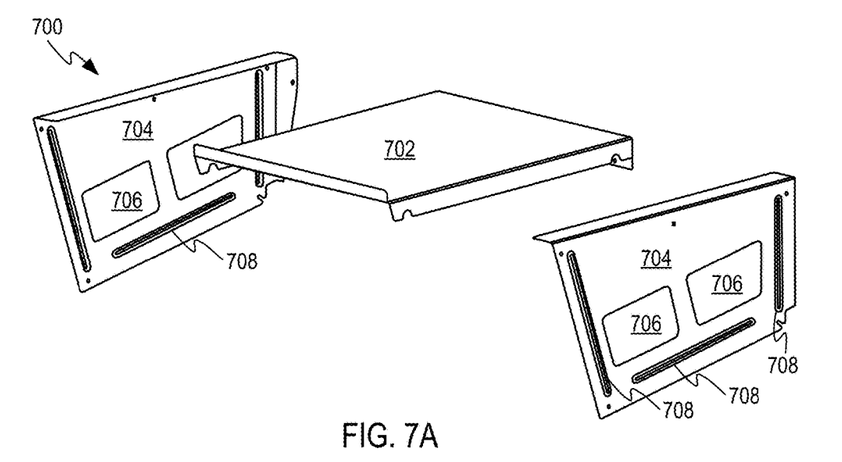
FIGS. 7A-7B show components that can be bolted together to form a shade cover.

FIG. 7A shows an exploded perspective view of shade cover 700 suitable for protecting inverter 100 from being heated up or even damaged by the sun. Shade cover 700 includes shade top 702 and shade panels 704. Each of shade panels 704 define vents 706 through which air can blow to help dissipate any heat generated by inverter 100. In addition to defining vents 706, shade panels 704 also include structural ribs 708 for increasing the rigidity of shade cover 700. Because shade cover 700 is not responsible for supporting anything but itself up, shade cover 700 can be formed of rather thin sheet metal, allowing it to have a lighter weight and be more readily able to be folded into the depicted shapes. In some embodiments, shade cover 700 can be formed of more reflective materials that are well-suited for reflecting light that would otherwise tend to heat up the inverter rack to which shade cover 700 is configured to be attached.

Figure 7B:
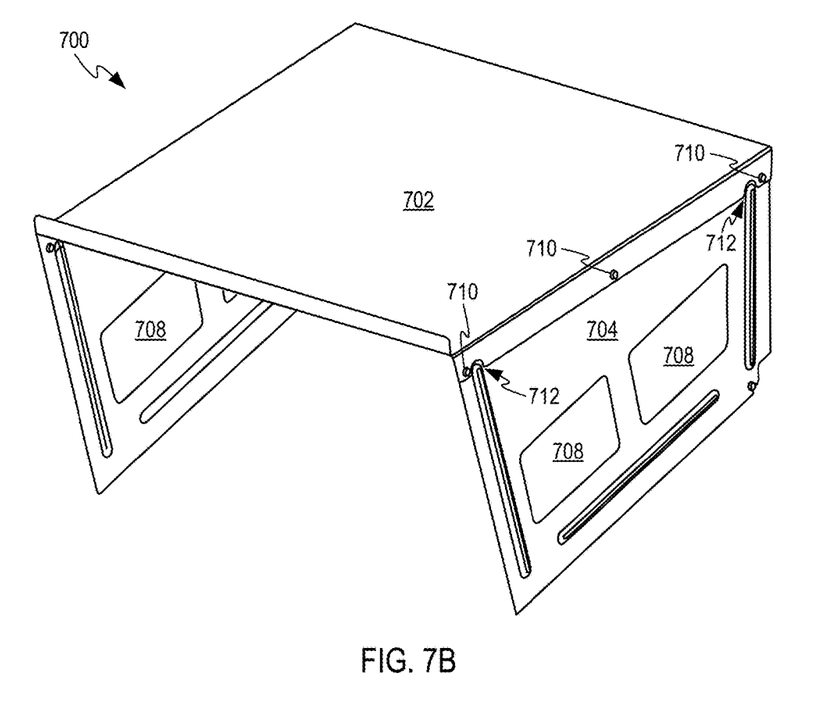

FIG. 7B shows an assembled perspective view of shade cover 700. As depicted, top portions of shade panels 704 fit into a shallow cavity defined by shade top 702. Each of shade panels 704 is either riveted or bolted to shade top 702 by fasteners 710. Further, portions of structural ribs 708 are accommodated by notches 712 defined by shade top 702.

Figure 8A:
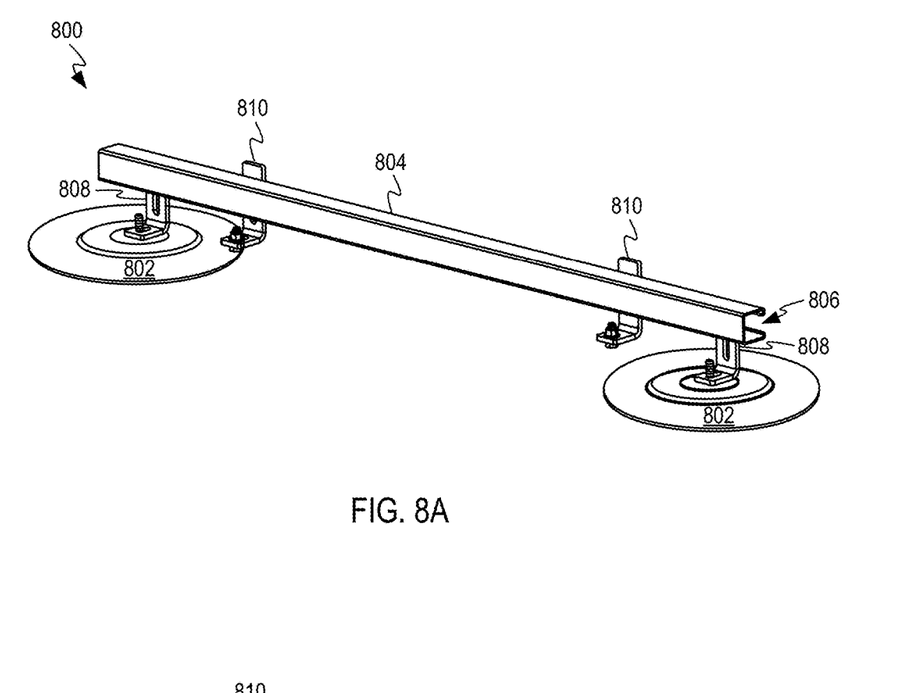
FIGS. 8A-8B show a perspective view of an anchor attachment.

FIG. 8A shows anchor attachment 800, which includes roof anchors 802 and attachment strut 804. Roof anchors 802 can be coupled to channel 806 of attachment strut 804 by L-brackets 808. Attachment strut 804 is configured to be attached to support members 106 by L-brackets 810. A portion of each of L-brackets 810 is configured to be inserted into channels defined by support members 106.

Figure 8B:
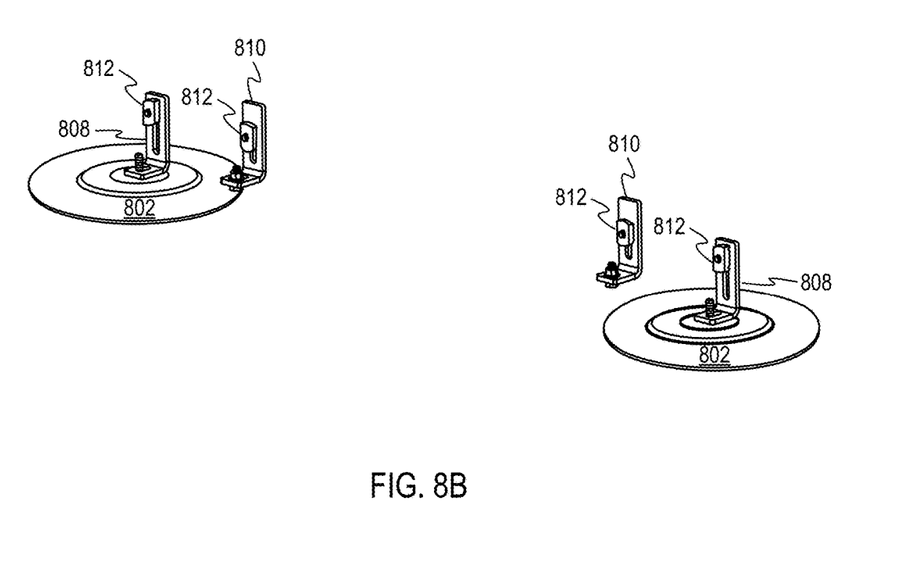

FIG. 8B shows anchor attachment 800 without attachment strut 804 to more clearly depict L-brackets 808 and 810. Each of L-brackets 808 and 810 include strut nut 812 engaged within corresponding openings defined by L-brackets 808 and 810. Strut nuts 812 can be configured to engage channel 806 of attachment strut 804. Each of L-brackets 810 include another opening for a fastener and nut configured to secure support members 106 to each of L-brackets 810.

Figure 9:
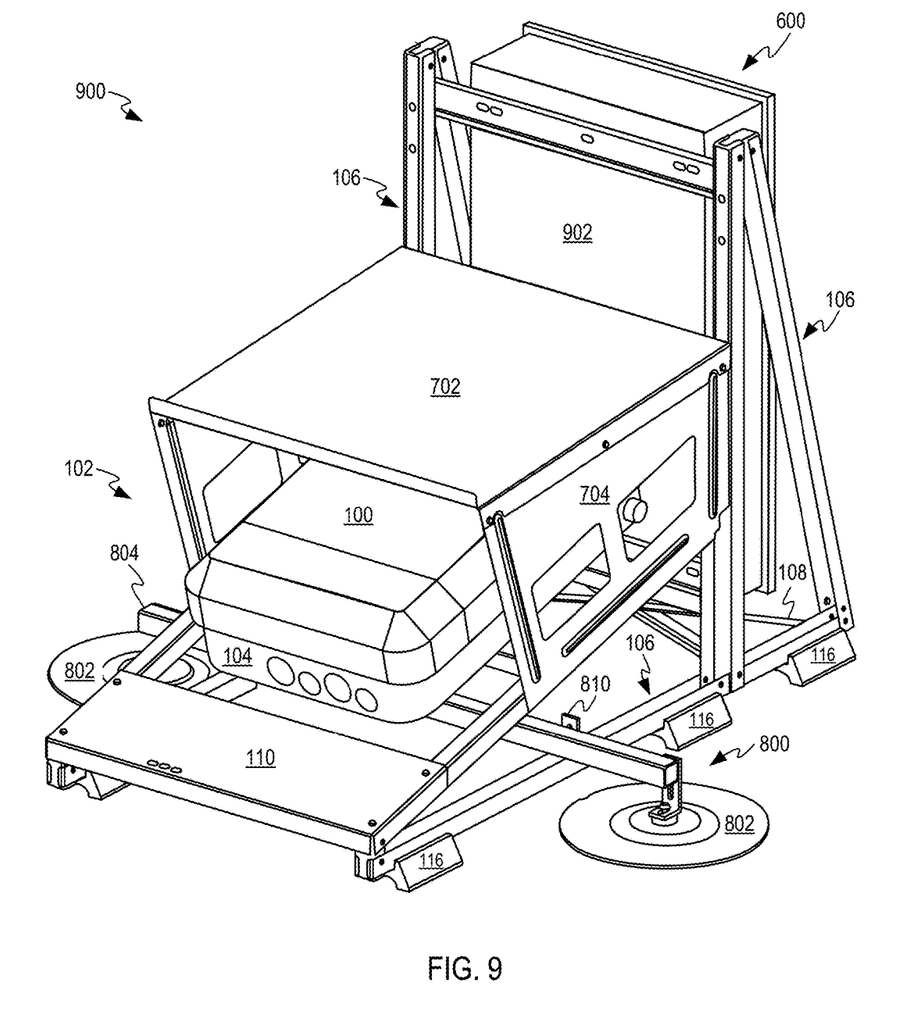
FIG. 9 shows a perspective view of an inverter rack assembly, which includes an inverter rack, a load center support structure, an anchor attachment and a shade cover.

FIG. 9 shows a fully assembled inverter rack assembly 900, which includes inverter rack 102 and load center support rack 600. In particular, load center 902 is shown attached to load center support rack 600 in a manner that orients load center 902 in a substantially vertical orientation. Further, by bolting support members 106 of both inverter rack 102 and load center support rack 600 together, a substantially flat bottom surface of inverter rack assembly 900 can be achieved shown resting on deformable feet 116. This offsets an orientation of inverter rack 102 about 90 degrees from an orientation of load center support rack 600. It should be noted that inverter rack 102 and load center support rack 600 are very similar and only differ with respect to other supporting components that are coupled to them. For example, both inverter rack 102 and load center support rack 600 both include two support members 106 as well as two cross struts.

By coupling inverter rack 102 to load center support rack 600 a substantially flat lower surface can be achieved, allowing deformable feet 116 to contact a support surface upon which inverter rack assembly 900 is positioned. It should be noted that when support members 106 of load center support rack 600 are attached to support members 106 of inverter rack 102 that cross-bars 108 can be positioned on a downward facing portion of load center support rack 600 since support members 106 of load center support rack 600 function to stabilize the rear end of inverter rack 102.

FIG. 9 also shows anchor attachment 800. Anchor attachment 800 includes roof anchors 802, which can be attached to a support surface taking the form of a rooftop. In some embodiments, anchors 802 can have a circular geometry as shown, while in other embodiments, anchors 802 can have a rectangular geometry. Generally, anchors 802 will include an attachment mechanism facing the rooftop. For example, the rooftop facing surface can include a series of protrusions that engage a surface of the rooftop. Attachment strut 804, which couples anchors 802 to inverter rack 102 and each other, also includes L-brackets 810, which can be configured to couple attachment strut 804 to each of support members 106 that form inverter rack 102.

While not depicted in FIG. 9, in some embodiments, the space beneath the portion of inverter rack 102 that supports inverter 100 can be configured to accommodate ballast to secure inverter rack assembly 900 in place without anchors. The ballast can be supported by a support tray secured between support members 106. The support tray can also be formed from folded sheet metal and can include lateral walls that prevent any ballast from sliding out from beneath inverter 100. The aforementioned ballast configuration discussed above can be particularly effective on rooftops with very low pitch and in areas with very low likelihood of earthquake activity.

Figure 10:
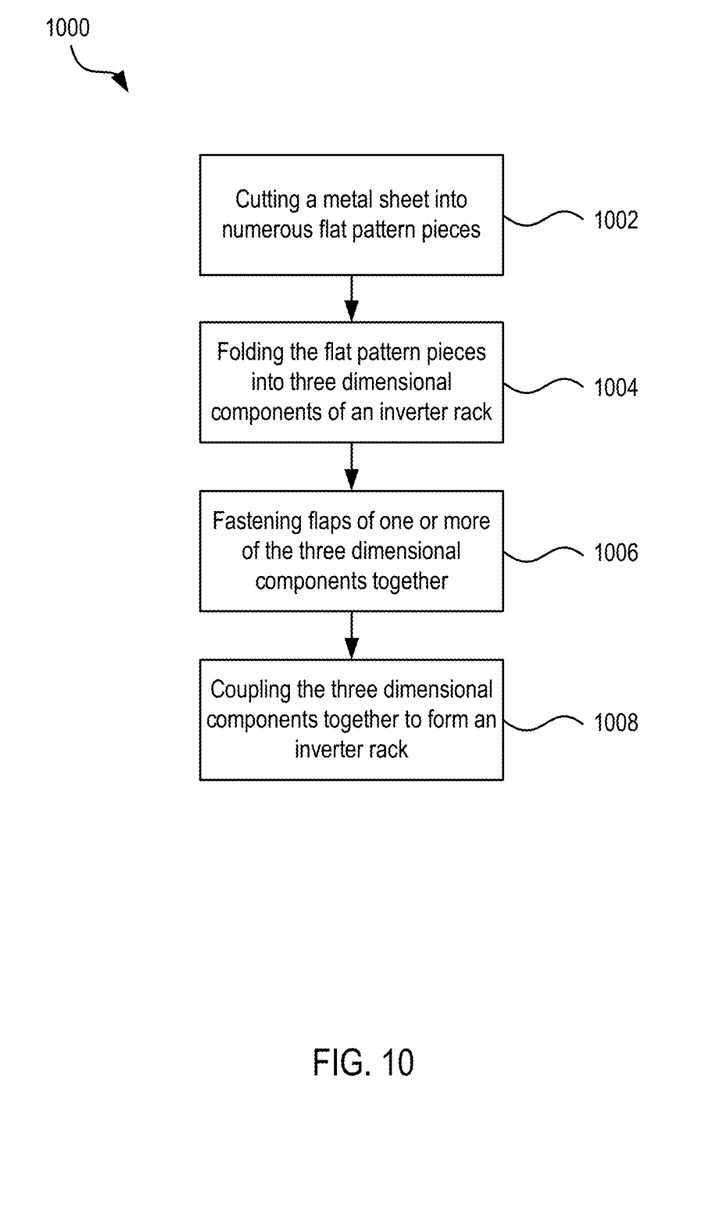
FIG. 10 shows a flow chart representing a method for creating an inverter rack from sheet metal.

FIG. 10 shows flow chart 1000 representing a method for creating an inverter rack. At 1002, a metal sheet can be cut or sliced into numerous flat pattern pieces. Various cutting implements can be utilized to perform this method, including for example a stamped pattern, a cutting blade or a laser. At 1004, the flat pattern pieces can be folded multiple times to form a three dimensional component. In some embodiments, a particular component may need to undergo only one or two folding operations. Other more complex three-dimensional components can involve a few different folding operations. At 1006, the shape achieved by folding the flat pattern pieces into three dimensional components can be maintained by fastening different portions of each three dimensional component together. For example, one or more of the three dimensional components can include overlapping flaps that can be fastened together to fix an angle of one portion of the three dimensional component with respect to another portion of the three dimensional component. At 1008, each of the three dimensional components can be coupled together to form an inverter rack. Different ones of the three-dimensional components can serve different purposes. For example, support members of the inverter rack can provide structural support and an overall shape to the rack, whereas other components can be utilized to secure various electrical components to the inverter rack. Alternatively, in lieu of coupling the three dimensional components together, the three dimensional components can be packed into shipping boxes for transportation of the three dimensional components to a job site.

The various aspects, embodiments, implementations or features of the described embodiments can be used separately or in any combination.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A rack, comprising:
   a first support structure having a sloped surface configured to support an inverter at an acute angle with respect to a supporting surface upon which the first support structure is positioned;
   a load center; and
   a second support structure coupled to the first support structure, the second support structure being positioned on the supporting surface, wherein the second support structure is secured to and supports the load center at a substantially orthogonal angle with respect to the supporting surface,
   wherein each of the support structures is formed from a plurality of substantially triangular support members, the substantially triangular support members of the first support structure being interchangeable with the substantially triangular support members of the second support structure.

2. The rack of claim 1, wherein the first support structure is oriented in a first direction and the second support structure is oriented in a second direction substantially perpendicular to the first direction.

3. The rack of claim 1, wherein when the rack is positioned upon the supporting surface, the second support structure extends substantially farther away from the supporting surface than the first support structure.

4. The rack of claim 1, further comprising the inverter secured to the sloped surface of the first support structure.

5. The rack of claim 1, wherein the supporting surface is a roof having a pitch of less than ten degrees.

6. The rack of claim 1, further comprising the inverter secured to the first support structure.

7. The rack of claim 1, wherein the substantially triangular support members of the first support structure are coupled together using cross struts that also support the inverter at the acute angle.

8. The rack of claim 1, wherein the substantially triangular support members are formed from folded sheet metal and reinforced by fasteners that couple overlapping flaps of the folded sheet metal together.

9. A method for installing an inverter rack on a rooftop, comprising:
   cutting one or more metal sheets into a plurality of flat pattern sheets;
   folding the flat pattern sheets into first and second substantially triangular support members;
   coupling the first and second substantially triangular support members together to form the inverter rack;
   coupling an attachment strut to both the first and second substantially triangular support members, the attachment strut extending through openings defined by both the first and second substantially triangular support members; and
   coupling the attachment strut to the rooftop using a plurality of roof anchors.

10. The method of claim 9, further comprising coupling at least two of the first and second triangular support members together with a pair of cross members.

11. The method of claim 9, wherein the one or more metal sheets include metal sheets of different thicknesses.

12. The method of claim 9, wherein the openings defined by the triangular support members through which the attachment strut extends have a substantially triangular geometry.

13. The method of claim 9, wherein folding the flat pattern sheets into three dimensional components comprises folding a single flat pattern sheet into a three dimensional component having three legs.

14. An inverter rack assembly, comprising:
   an inverter rack configured to support an inverter at an acute angle with respect to a supporting surface upon which the inverter rack assembly is positioned;
   a load center support structure coupled to the inverter rack, the load center support structure having substantially the same shape as the inverter rack and being positioned on the supporting surface in an orientation substantially orthogonal with respect to the orientation of the inverter rack, the inverter rack and the load center support structure both being formed from a plurality of substantially triangular support members;

an anchor attachment coupling the inverter rack to the supporting surface, the anchor attachment comprising:

an attachment strut extending through openings defined by each one of the plurality of substantially triangular support members forming the inverter rack; and a plurality of roof anchors coupling the attachment strut to the supporting surface.

15. The inverter rack assembly of claim 14, further comprising:

a shade cover coupled with the inverter rack and configured to shield the inverter from the sun.

16. The inverter rack assembly of claim 15, wherein the shade cover includes a shade top coupled to the inverter rack by two shade panels.

17. The inverter rack assembly of claim 14, wherein the openings of the plurality of substantially triangular support members through which the attachment strut extends have a substantially triangular geometry.

18. The inverter rack assembly of claim 14, wherein the plurality of roof anchors are coupled to opposing ends of the attachment strut.

* * * * *